UNITED STATES PATENT OFFICE.

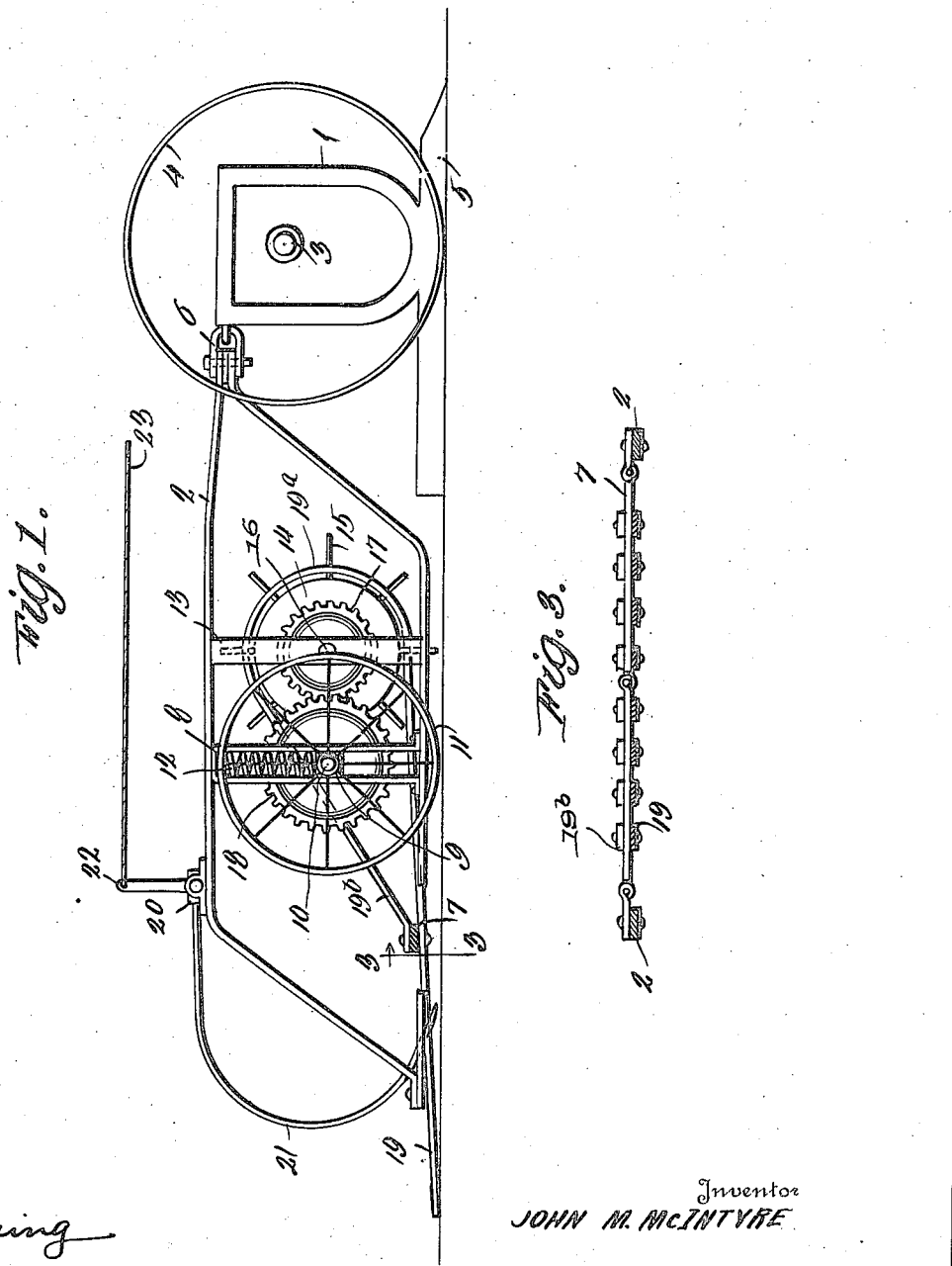

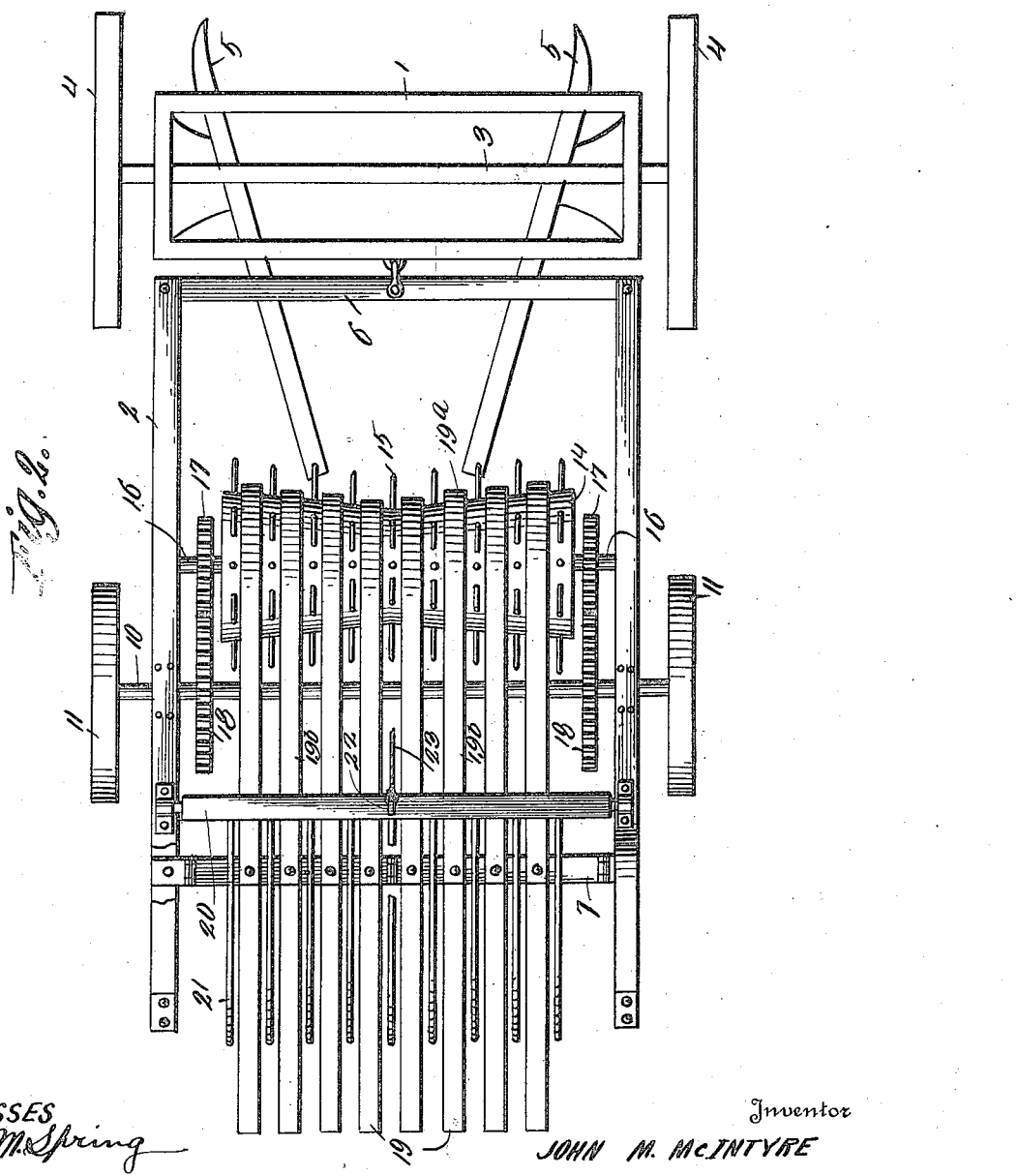

JOHN M. McINTYRE, OF BAD AXE, MICHIGAN.

BEAN BUNCHER.

1,424,839. Specification of Letters Patent. Patented Aug. 8, 1922.

Application filed April 9, 1920. Serial No. 372,502.

*To all whom it may concern:*

Be it known that I, JOHN M. McINTYRE, citizen of the United States, residing at Bad Axe, in the county of Huron and State of Michigan, have invented certain new and useful Improvements in a Bean Buncher, of which the following is a specification.

The invention relates to agricultural implements and more particularly to machines for gathering crops, such as beans, peas and the like, which grow on vines and usually trail upon the ground.

The invention provides a machine which may be drawn over the field and which in operation uproots the vines and carries the same until a sufficient quantity has accumulated to form a bunch or pile of given size when the same may be deposited upon the ground, whereby the subsequent gathering is greatly facilitated.

The implement comprises a gatherer, which directs the beans or like product inwardly, a puller for uprooting and lifting the beans, a support for receiving and holding the beans until a pile or bunch of predetermined size has been formed and means for releasing the pile or bunch, whereby the same may be deposited upon the ground to be subsequently gathered and transported to a convenient point for thrashing or other operation.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the drawings hereto attached;—

Fig. 1 is a side view of a bean buncher embodying the invention.

Fig. 2 is a top plan view of the machine.

Fig. 3 is a sectional detail of the support on the line 3—3 of Fig. 1.

Corresponding and like parts are referred to in the following description and indicated in the several views of the drawings by like reference characters.

The implement comprises essentially two frames, a front wheel frame 1 and a rear runner frame 2. The two frames 1 and 2 are connected in any manner to admit of a relative movement, so that they may readily conform to the surface of the ground over which the machine may be propelled. The front frame 1 is mounted upon an axle 3 which is provided at its ends with supporting wheels 4. Guide members 5 are secured to the frame 1 and rearwardly converge so as to direct the beans or other product towards the center of the machine to be engaged by the uprooting and lifting device. The guard members 5 are shown as consisting of bars, which are disposed so as to run upon the ground and gather the vines and direct the same inwardly as the machine advances.

The runner frame 2 comprises side runners which are connected by crossbars 6 and 7. The rear cross bar 7 preferably consists of a plurality of sections which are hingedly connected, as shown most clearly in Fig. 2, whereby provision is had for such bar to conform to irregularities in the surface of the ground. Each side runner is provided with a vertically disposed guide 8, Fig. 1. A bearing 9 is mounted in each of the guides 8 and is free to move vertically therein. An axle 10 is journaled in each of the bearings 9 and is provided at its ends with ground wheels 11. An expansible helical spring 12 is mounted in the upper portion of each of the guides 8 and exerts a downward pressure upon the bearing 9 so as to yieldably hold the ground wheels 11 in contact with the soil to insure rotation of the ground wheels and the axle 10 to which they are secured.

An upright 13 is provided for each side runner and is disposed forwardly of the guide 8. A rotary member is mounted in the uprights 13 and is geared to the axle 10 so as to rotate therewith. The rotary member is designated by the numeral 14, and inclines from a medial point towards opposite ends. Teeth 15 project radially from the rotary member 14 and are adapted to engage the vines and uproot and lift the same. The rotary member 14 is contracted midway of its ends and tapers outwardly in opposite directions, the outer ends being of like diameter which is greater than the diameter of the intermediate or central portion. The teeth 15 may be of any construction best adapted for the particular work which the machine is designed. The journals 16 of the rotary member are mounted in the uprights 13 and each journal has a gear 17 which meshes with a gear wheel 18 secured to the axle 10.

A support is provided for receiving the beans and holding the same until a sufficient quantity has accumulated to form a bunch of required size. The support comprises a plurality of slats or strips 19, which are disposed so as to trail upon the ground. The slats or strips 19 are secured to the sectional bar 7, hence the rear portion of the support is adapted to readily conform to the surface condition of the ground over which the machine is traveling. The strips 19 are doubled upon themselves and extend around the rotary member 14, as indicated at 19ᵃ, the folded ends extending rearwardly and downwardly as indicated at 19ᵇ. The folded portion 19ᵃ approaches close to the rotary member 14 and acts as a guard and a stripper to prevent the vines from adhering to and following the rotary member 14 so as to accumulate thereon and retard its action. The inclined portion 19ᵇ serves to direct the beans and vines to the rear portion of the support. As indicated most clearly in Fig. 2 the strips 19 are spaced apart to provide a clearance for the teeth 15.

A rake or holder is mounted upon the rear portion of the runner frame 2 and comprises a head 20 and tines 21. This rake is mounted so as to tilt and thereby admit of the load being discharged at stated intervals or as may be required. The rake head 20 is provided at its ends with journals which are mounted in bearings disposed at the upper rear portion of the runner frame. An arm 22 projects upwardly from the rake head 20, and a cord 23 or analogous connection is attached to said arm and extends within convenient reach of the driver to admit of the rake or holder 21 being operated when it is required to discharge the bunch which has been formed upon the support 19.

In the operation of the machine the latter is propelled over the ground in any convenient and preferred way. The vines are gathered by the guards 5 and are directed thereby to the center portion of the rotary member 14. As the machine advances the member 14 is rotated through the instrumentality of the gearing connecting it with the axle 10, the latter being set in motion by the wheels 11 traveling upon the ground. The teeth 15 engage the vines and uproot or pull the same and the vines thus released are carried upward and rearward and are delivered upon the inclined portion 19ᵇ and are directed thereby to the rear portion of the support 19. The rake or holder 21 retains the vines and beans until a sufficient quantity has accumulated to form a bunch of required size. The driver now discharges the bunch by pulling upon the cord 23 which elevates the rake or holder 21 and admits of the bunch discharging. It must be remembered that the strips 19 are spaced apart. As a result portions of the vines extend through the spaces and come in contact with the ground and dragging thereon tend to move the bunch rearward. As soon as the bunch is released from the rake or holder 21 it moves from the support 19. In other words the bunch by reason of its contact with the ground is held whereas the machine advancing withdraws the support from beneath the bunch and the latter is discharged in a pile. The tines 21 of the rake or holder are disposed so as to extend through the spaces formed between the strips 19 and engage the surface of the ground so as to gather any vines and beans which may escape the action of the rotary member 14.

Having thus described the invention what is claimed as new and desired to be secured by Letters Patent is:—

1. In a machine of the character specified, a toothed rotary member, a plurality of strips having an end portion bent to extend around said rotary member and incline downwardly and rearwardly, and means for connecting the strips and admitting of their having an independent movement to conform to the surface condition of the ground.

2. In a machine of a character set forth, a supporting frame, a toothed member mounted in the frame and adapted to have a rotary movement imparted thereto, an axle yieldably mounted in the frame and provided with ground wheels, and connecting means between said axle and said toothed member to impart a positive rotary movement to the latter.

3. In a machine of a character set forth, runners, a toothed rotary member supported by the runners, an axle yieldably mounted in the runners, ground wheels on the axle and adapted to impart movement thereto, and means for transmitting movement from the axle to said rotary member.

4. In a machine of the character set forth, a rotary toothed member, a plurality of strips having their forward portions bent to extend around the toothed member and inclined downwardly and rearwardly, and a flexible member connecting the strip and having the folded end portions secured thereto.

In testimony whereof I affix my signature in presence of two witnesses.

JOHN M. McINTYRE.

Witnesses:
XENOPHON A. BOOMHOWER,
CHARLES D. THOMPSON.